United States Patent [19]

Busacca et al.

[11] 4,330,760
[45] May 18, 1982

[54] SYSTEM FOR CORRELATING THE OPERATING FREQUENCIES OF TWO VARIABLE-FREQUENCY MICROWAVE GENERATORS

[75] Inventors: Guido Busacca; Vincenzo Meli; Antonio Rossi, all of Palermo, Italy

[73] Assignee: Societa Italiana Telecomunicazioni Siemens S.p.A., Milan, Italy

[21] Appl. No.: 125,265

[22] Filed: Feb. 27, 1980

[30] Foreign Application Priority Data

Feb. 28, 1979 [IT] Italy ............................ 20613 A/79

[51] Int. Cl.³ .................... G01S 13/00; H03L 7/00
[52] U.S. Cl. .................................... 331/55; 331/90; 331/172; 343/5 AF
[58] Field of Search .................. 331/55, 2, 90, 172; 455/77, 161–165, 167–169, 256, 265; 343/5 AF

[56] References Cited

U.S. PATENT DOCUMENTS 3,358,282  12/1967  Wasterlid ................. 331/90 X
4,225,829  9/1980  Kumagai .................. 331/2 X

*Primary Examiner*—Siegfried H. Grimm
*Attorney, Agent, or Firm*—Karl F. Ross

[57] ABSTRACT

Two variable-frequency microwave generators, i.e. a coaxial magnetron producing outgoing waves and a voltage-controlled oscillator emitting a heterodyning signal for incoming waves of a radar transceiver, are continuously tuned by a pilot signal modifying their operating frequencies with a predetermined constant separation. To maintain this correlation, the tuning circuit of at least one microwave generator responds to the pilot signal through the intermediary of a read-only memory which, on being directly or indirectly addressed by that signal, emits stored setting instructions for the respective generator.

8 Claims, 9 Drawing Figures

4,330,760

SYSTEM FOR CORRELATING THE OPERATING FREQUENCIES OF TWO VARIABLE-FREQUENCY MICROWAVE GENERATORS

FIELD OF THE INVENTION

Our present invention relates to a system for the production of two microwave oscillations whose frequencies, different from each other, are subjected to concurrent variation in a correlated manner.

BACKGROUND OF THE INVENTION

In a radar transceiver, for example, outgoing microwaves are conventionally frequency-modulated according to a periodic law which must also be used in concurrent modulation of a heterodyning signal used for demodulating incoming waves reflected by an external target. Thus, a constant frequency difference $\Delta f$ must be maintained at all times between these two variable oscillations. The outgoing high-frequency waves, radiated by a directive antenna, are sometimes generated by a coaxial magnetron which is tunable with the aid of a reciprocating piston. An eccentric shaft portion of a servomotor is linked with the piston by a crank drive to translate a rotation of that shaft into a linear motion of the piston. With such a crank drive, however, the angular displacement of the shaft from a reference position is not strictly proportional to the piston stroke. Thus, the piston does not lie exactly midway between its two dead-center positions when the shaft has been turned through 90° from such a dead-center position.

Since the operating frequency of the coaxial magnetron is a function of the effective volume of its resonant cavity which changes with the piston stroke, it is convenient to use an angular resolver which senses the current rotary position of the motor shaft and emits a feedback signal serving as an indication of the instantaneous operating frequency. A comparator, receiving this feedback signal along with a pilot signal from a tuning-control circuit, sets the servomotor in a position corresponding to the desired operating frequency by generating an error signal corresponding to the difference between its two input signals. The same feedback signal can also be used for the concurrent tuning of a voltage-controlled oscillator (VCO) generating the heterodyning signal. Proper correlation of the operating frequency of the magnetron and the VCO, however, requires a linearization of the relationship between the piston stroke and the shaft rotation. Various mechanical linearizers are already known for this purpose. There have also been proposals for linearly operating crank drives; see commonly owned U.S. applications Ser. No. 8,091, filed Jan. 31, 1979 by one of us (Guido Busacca) jointly with three others, and Ser. No. 53,275, filed June 29, 1979 by two of us (Guido Busacca and Vincenzo Meli) jointly with one other now U.S. Pat. Nos. 4,234,855 and 4,247,828, respectively.

OBJECTS OF THE INVENTION

Since a mechanical linearizer is subject to unavoidable wear, the general object of our present invention is to provide purely electronic means for obviating the need for such a linearizer.

A more specific object is to provide an improved system for the correlated modification of magnetron-generated and VCO-generated oscillations in a radar transceiver.

SUMMARY OF THE INVENTION

In accordance with our present invention, we provide first and second tuning means inserted between a source of pilot signal, varying within predetermined limits, and two microwave generators respectively controlled by that signal. At least one of these tuning means includes a read-only memory which stores digitized setting instructions for the corresponding microwave generator, along with coupling means for addressing the memory to response to the pilot signal in order to read out instruction codes which modify the operating frequency of the associated microwave generator in conformity with the modification of the operating frequency of the other microwave generator by the respective values of the pilot signal.

When the oscillation generator tunable through the intermediary of the read-only memory is a coaxial magnetron as discussed above, the memory may be interposed between the source of pilot signal and the comparator supplying the error signal to the servomotor which drives the tuning piston.

Alternatively, or possibly in combination therewith, such a memory may be part of a tuning circuit for the voltage-controlled oscillator, a digital/analog converter being then inserted between the memory and the control input of that oscillator. In the latter instance the memory need not be adressed directly by the pilot signal but may receive, instead, the feedback signal from the angular resolver (which, of course, is a function of the pilot signal) so that this resolver and the servomotor as well as the associated comparator form part of the aforementioned coupling means. Whenever the pilot signal arrives in analog form, the coupling means will also include an analog/digital converter.

BRIEF DESCRIPTION OF THE DRAWING

The above and other features of our invention will now be described in detail with reference to the accompanying drawing in which.

SPECIFIC DESCRIPTION

Figure 1A:
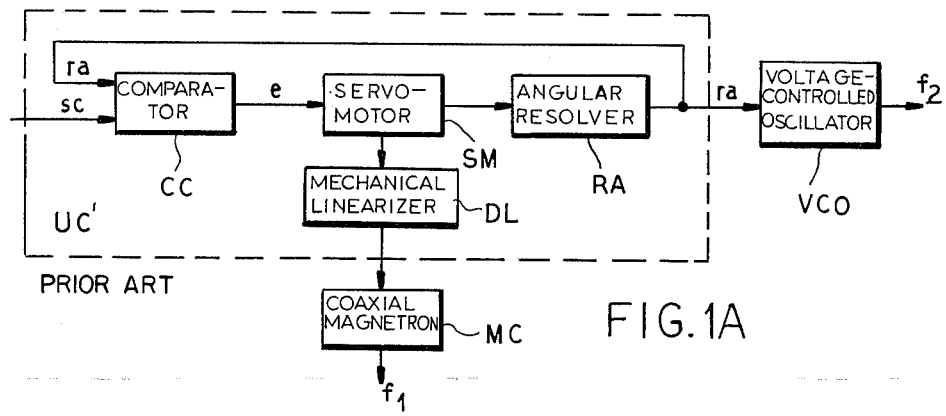
FIGS. 1A and 1B are block diagrams of a conventional tuning system for a coaxial magnetron and a voltage-controlled oscillator, using a mechanical linearizer.

FIG. 1A shows a control unit UC' for the correlated tuning of a coaxial magnetron MC and a voltage-controlled oscillator VCO, with respective operating frequencies $f_1$ and $f_2$, in response to a pilot signal sc which varies with a certain periodicity as determined by a nonillustrated tuning-control circuit of a radar system using the frequencies $f_1$ and $f_2$ in transmission and in reception, respectively. Unit UC' comprises a comparator CC receiving on one input the pilot signal sc and on another input a feedback signal ra emitted by an angular resolver RA which senses the rotary position of the crankshaft of a servomotor SM. An error signal e produced by comparator CC in the presence of any disparity between input signals sc and ra advances the servomotor SM in a sense tending to decrease the magnitude of this error signal, thereby varying the frequency $f_1$ of magnetron MC in the aforedescribed manner. A mechanical linearizer DL couples the motor shaft to the tuning piston of the magnetron to correlate its frequency variation with that of oscillator VCO in order to provide a constant frequency different $\Delta f = f_1 - f_2$.

Figure 1B:
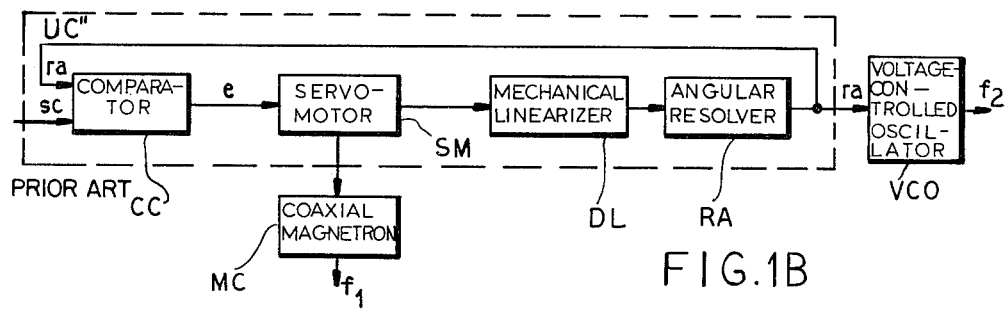

A slightly different conventional control unit UC", shown in FIG. 1B, comprises the same components as unit UC' of FIG. 1A but has the mechanical linearizer DL inserted between the servomotor SM and the angular resolver RA. The two systems are equivalent in their mode of operation.

Figure 2:
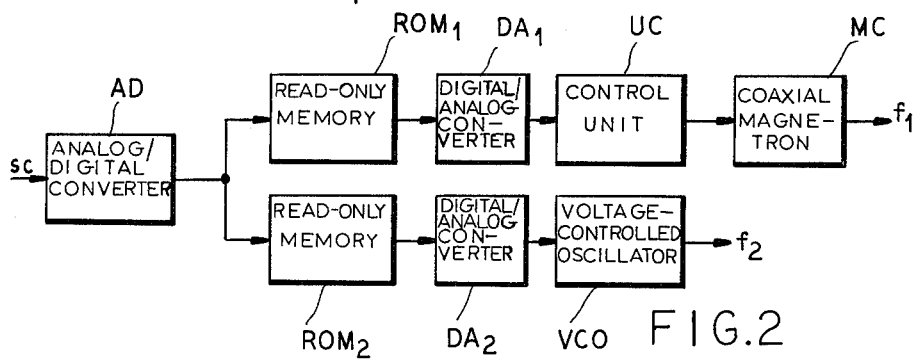
FIG. 2 is a block diagram of an improved tuning system embodying our invention.
Figure 6:
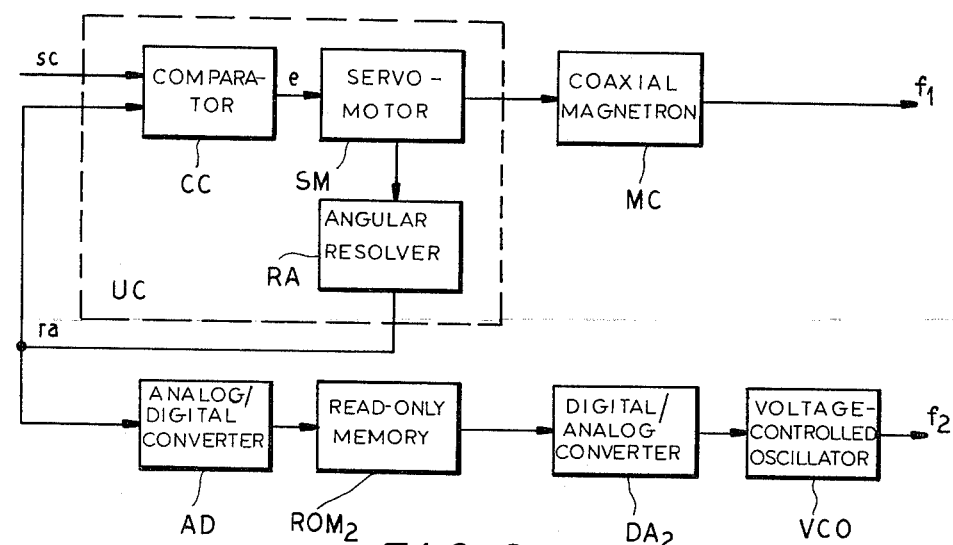
Figure 7:
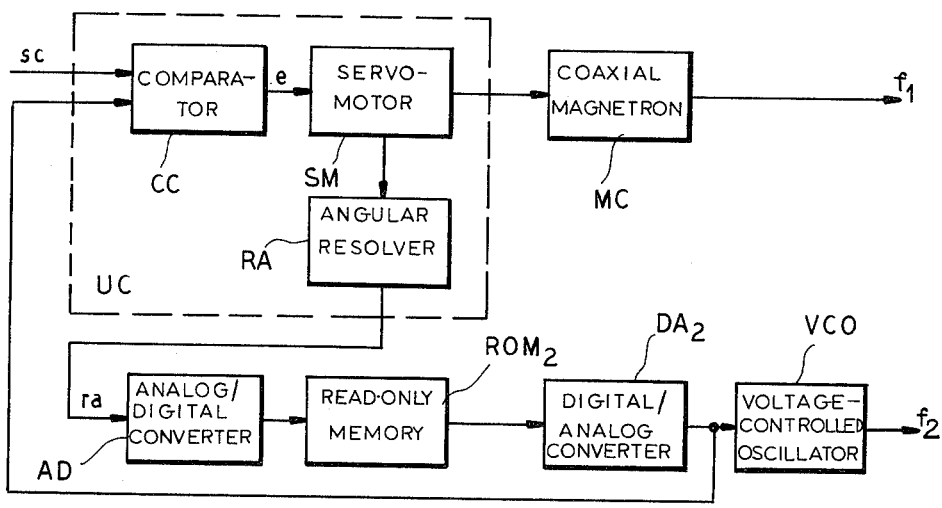

Reference will now be made to FIG. 2 which shows a tuning system according to our invention for varying the operating frequencies of magnetron MC and oscillator VCO is step with each other. The pilot signal sc is here fed in parallel, by way of an analog/digital converter AD, to the address inputs of two read-only memories $ROM_1$ and $ROM_2$ whose cells contain instruction codes, obtained mathematically or empirically, for a correlated setting of the two oscillation generators MC and VCO corresponding to the instantaneous magnitude and polarity of signal sc. Memories $ROM_1$ and $ROM_2$ are read out into respective digital/analog converters $DA_1$ and $DA_2$, converter $DA_1$ feeding the comparator of a control unit UC whereas converter $DA_2$ works directly into the control input of oscillator VCO. Control unit UC, more fully illustrated in FIGS. 6 and 7, is similar to units UC' and UC" of FIGS. 1A and 1B but lacks the mechanical linearizer DL; also, the feedback signal ra from its angular resolver RA is not transmitted to oscillator VCO.

Figure 3A:
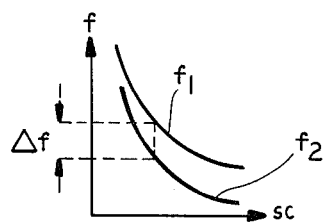
FIGS. 3A and 3B are graphs showing correlated changes in the operating frequencies of the magnetron and the voltage-controlled oscillator included in the system of FIG. 2.
Figure 3B:
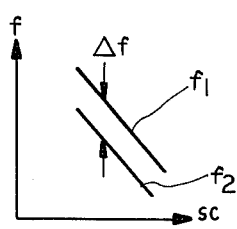

The instruction codes stored in memories $ROM_1$ and $ROM_2$ may establish the output frequencies $f_1$ and $f_2$ of generators MC and VCO as nonlinear or linear functions of pilot signal sc, as respectively illustrated in FIGS. 3A and 3B. It will be seen that the separation of these frequencies has a constant value $\Delta f$ in either case.

Figure 4:
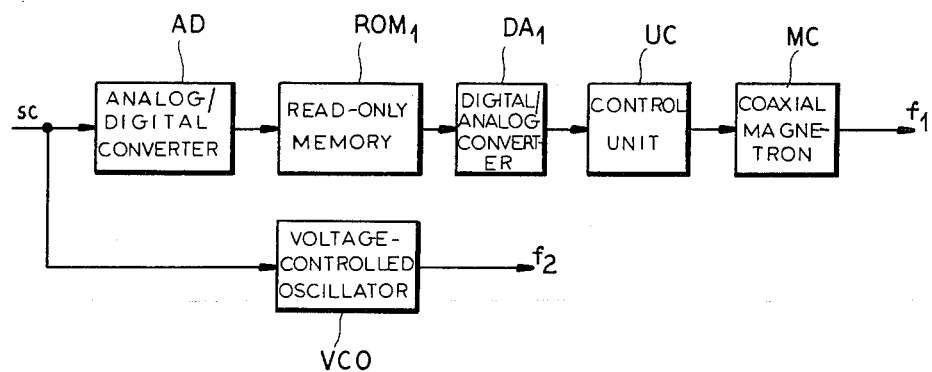
FIGS. 4, 5, 6 and 7 are further block diagrams illustrating various modifications of the system of FIG. 2.
Figure 5:
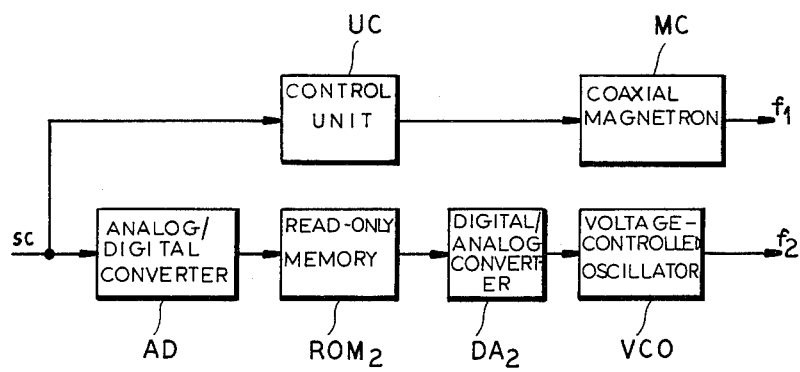

The circuit arrangement of FIG. 2 is mainly of theoretical interest since, generally, it will be sufficient to use a single memory $ROM_1$ or $ROM_2$ in one or the other branch of the tuning system. Thus, as shown in FIG. 4, oscillator VCO may be controlled directly by pilot signal sc whereas control unit UC receives the setting instructions read out from memory $ROM_1$ in response to that pilot signal. Conversely, FIG. 5 shows the control unit UC directly energized by signal sc while oscillator VCO responds to the instruction codes read out from memory $ROM_2$.

If the servomotor of control unit UC is of the step-by-step type so that the feedback signal ra has discrete values, the digital/analog converter $DA_1$ may be omitted in FIGS. 2 and 4. The analog/digital converter AD will also be redundant if the pilot signal sc is already received in digital form from the associated tuning-control circuit.

In FIG. 6 we have illustrated the possibility of addressing the memory $ROM_2$ by the feedback signal ra in lieu of the pilot signal sc which is fed only to the comparator CC of control unit UC. Converter AD, needed only when the feedback signal is in analog form, is therefore inserted between the output of angular resolver RA and the address input of memory $ROM_2$.

A similar arrangement has been shown in FIG. 7 where, however, the feedback signal ra is not retransmitted to comparator CC. Instead, the instruction codes read out from memory $ROM_2$ in response to that feedback signal are applied, after translation into analog form by converter $DA_2$, to the second input of comparator CC in order to be differentially combined with the pilot signal sc to produce the error signal e for the advance of servomotor SM. If the pilot signal sc is digitized, the transcoded feedback signal could be fed to the comparator directly from the output of memory $ROM_2$.

We claim:

1. A system for producing two microwave oscillations of different frequencies varying in a correlated manner, comprising:
   a first and a second microwave generator tunable in different frequency ranges, one of said microwave generators being a coaxial magnetron, the other being a voltage-controlled oscillator;
   a source of pilot signal varying within predetermined limits; and
   first and second tuning means inserted between said source and said first and second microwave generators, respectively, for modifying the operating frequencies thereof in response to said pilot signal, at least said first tuning means including a read-only memory storing digitized setting instructions for said first microwave generator and further including coupling means for addressing said memory in response to said pilot signal for reading out setting instructions which modify the operating frequency of said first microwave generator in conformity with the modification of the operating frequency of said second microwave generator by said pilot signal, the tuning means associated with said magnetron comprising a drive motor with a rotating shaft, sensing means emitting a feedback signal depending on the angular position of said shaft, and comparison means for deriving from said pilot signal and said feedback signal an error signal controlling said drive motor.

2. A system as defined in claim 1 wherein said magnetron is said first microwave generator, said memory being interposed between said source and said comparison means.

3. A system as defined in claim 1 wherein said voltage-controlled oscillator is said first microwave generator, further comprising a digital/analog converter inserted between said memory and a control input of said oscillator.

4. A system as defined in claim 3 wherein said sensing means forms part of said coupling means.

5. A system as defined in claim 4 wherein said sensing means has parallel output connections to said comparison means and to said memory.

6. A system as defined in claim 4 wherein said digital/analog converter is provided with an output connection to said comparison means for supplying said feedback signal thereto.

7. A system as defined in claim 4, 5 or 6 wherein said coupling means further includes an analog/digital converter downstream of said sensing means.

8. A system as defined in claim 1, 2 or 3 wherein said pilot signal is of analog character, said coupling means comprising an analog/digital converter inserted between said source and said memory.

* * * * *